(12) United States Patent
Suzuki et al.

(10) Patent No.: US 7,984,182 B2
(45) Date of Patent: Jul. 19, 2011

(54) NODE DEVICE, INFORMATION TRANSFER PROCESSING PROGRAM, AND NETWORK PARTICIPATION PROCESSING METHOD AND THE LIKE

(75) Inventors: Hiroaki Suzuki, Nagoya (JP); Yoshihiko Hibino, Nagoya (JP); Yuji Kiyohara, Nagoya (JP); Kentaro Ushiyama, Nagoya (JP); Koichi Iijima, Higashikurume (JP)

(73) Assignees: Brother Kogyo Kabushiki Kaisha, Nagoya (JP); Xing Inc., Nagoya (JP)

( * ) Notice: Subject to any disclaimer, the term of this patent is extended or adjusted under 35 U.S.C. 154(b) by 577 days.

(21) Appl. No.: 11/822,388

(22) Filed: Jul. 5, 2007

(65) Prior Publication Data
US 2007/0258389 A1 Nov. 8, 2007

Related U.S. Application Data

(63) Continuation-in-part of application No. PCT/JP2005/022919, filed on Dec. 14, 2005.

(30) Foreign Application Priority Data

Jan. 7, 2005 (JP) ................................ 2005-003051

(51) Int. Cl.
G06F 15/16 (2006.01)

(52) U.S. Cl. ........ 709/241; 709/226; 709/229; 370/236; 370/400

(58) Field of Classification Search .................. 370/229, 370/230.1, 231–234, 235, 236, 351, 395.32, 370/400, 409; 709/201, 202, 223–226, 229, 709/238, 241, 242, 244
See application file for complete search history.

(56) References Cited

U.S. PATENT DOCUMENTS

| | | | |
|---|---|---|---|
| 6,389,448 B1 * | 5/2002 | Primak et al. ................. 718/105 |
| 2002/0029287 A1 * | 3/2002 | Yemini et al. ................. 709/238 |
| 2002/0073075 A1 * | 6/2002 | Dutta et al. ........................ 707/3 |
| 2003/0101278 A1 * | 5/2003 | Garcia-Luna-Aceves et al. ............................... 709/240 |
| 2004/0054807 A1 * | 3/2004 | Harvey et al. ................. 709/243 |
| 2004/0064556 A1 * | 4/2004 | Zhang et al. ................... 709/225 |
| 2005/0076137 A1 * | 4/2005 | Tang et al. ..................... 709/238 |
| 2005/0198286 A1 * | 9/2005 | Xu et al. ........................ 709/225 |
| 2005/0243722 A1 * | 11/2005 | Liu et al. ........................ 370/235 |
| 2006/0120411 A1 * | 6/2006 | Basu et al. ..................... 370/539 |
| 2006/0239207 A1 * | 10/2006 | Naghian ....................... 370/254 |

OTHER PUBLICATIONS

Oka T. et al., "Lightweight Load Balancing for Distributed Hash Tables," Feb. 5, 2004, The Institute of Electronics, Information and Communication Engineers, vol. 103, No. 650, pp. 7-12.
Rowstron A. et al., "Pastry: Scalable, Decentralized Object Location and Routing for Large-scale Peer-to-Peer Systems," Nov. 12-16, 2001, Microsoft Research Ltd, vol. 2218.

* cited by examiner

*Primary Examiner* — Aung S Moe
*Assistant Examiner* — Curtis A Alia
(74) *Attorney, Agent, or Firm* — Oliff & Berridge, PLC

(57) ABSTRACT

A node device which participates in an overlay network formed by participation of all or part of a plurality of node devices which are connected to each other via a communication device. The node device includes a search information transmission device, a reply information receiving device, a communication load information device, a communication load comparison device, a node selection device and a participation request information transmission device. The search information transmission device transmits search information to search a node device transmitted to an information processing device connected to the communication device. The receiving device receives information replied from the plurality of node devices. The comparison device compares information regarding communication load in each of the communication routes. The selection device selects a node device on the basis of comparison result by the comparison device. The participation request information transmission device transmits the participation request information to the selected node device.

8 Claims, 9 Drawing Sheets

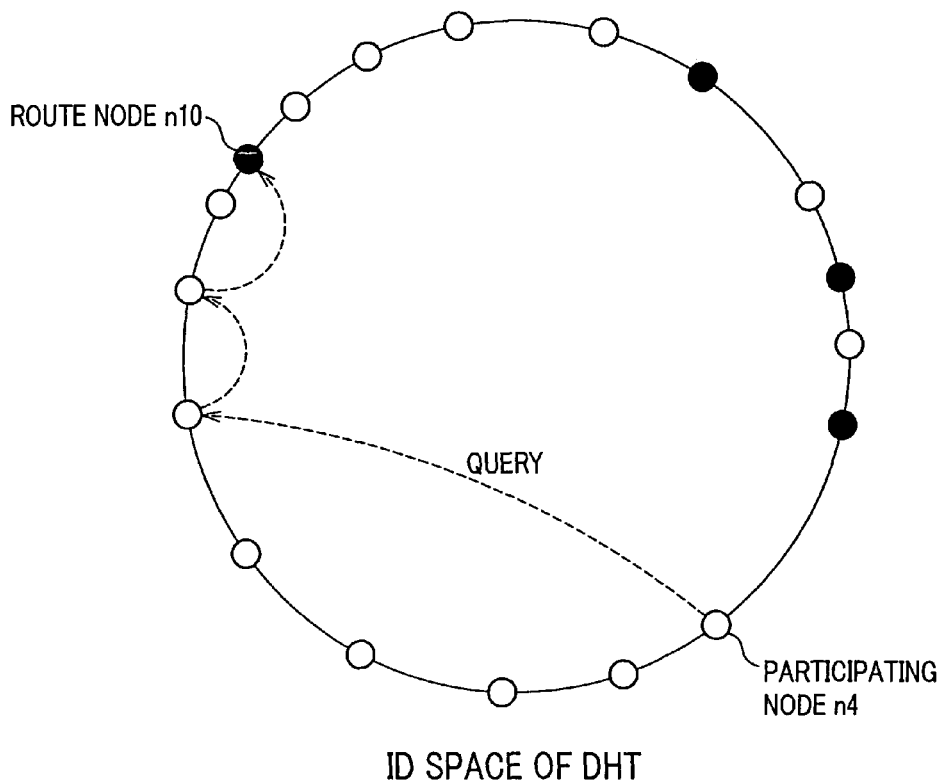

NODE ID SPACE OF DHT

FIG.8
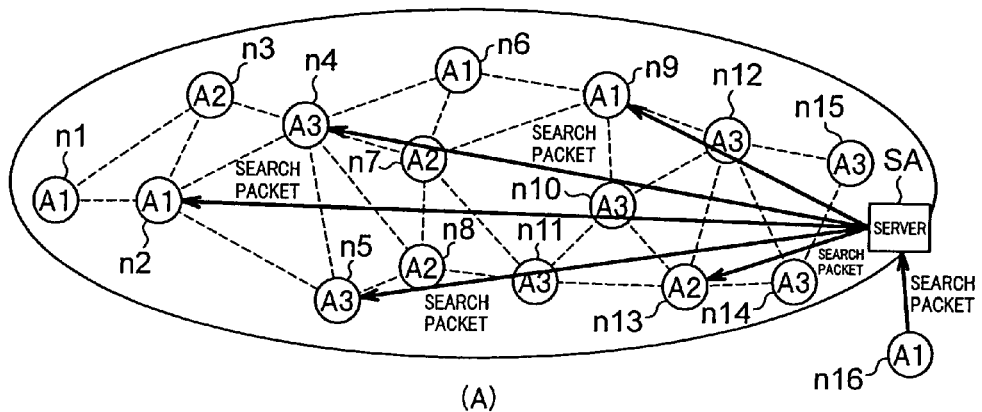
(A)
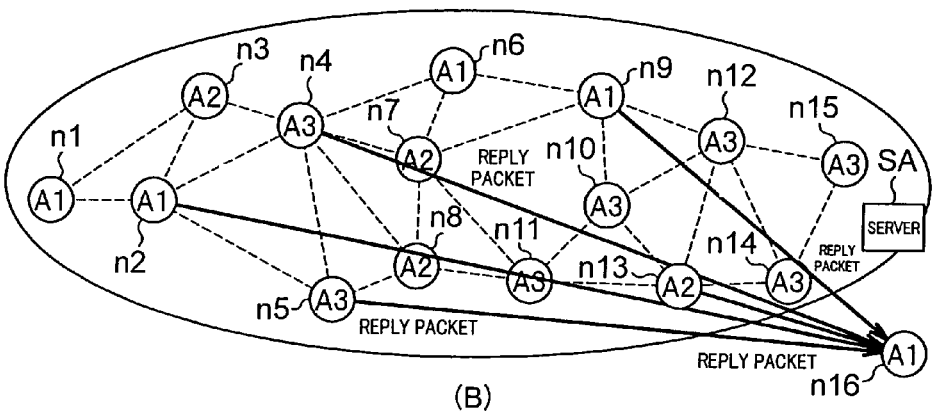
(B)
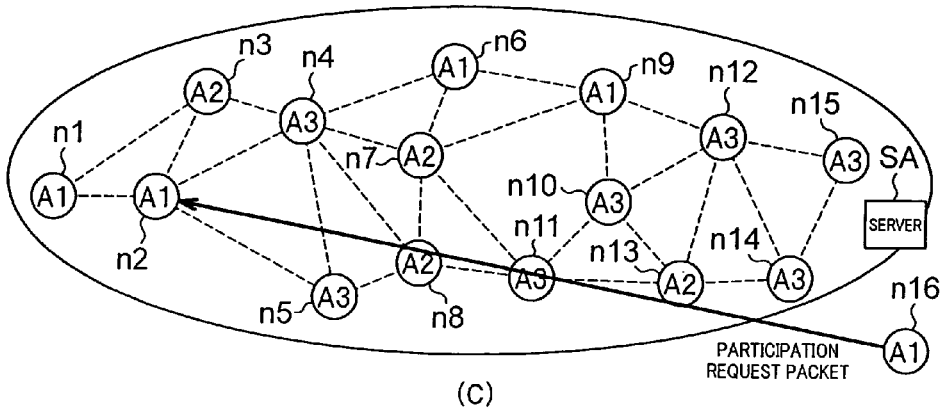
(C)

FIG.9
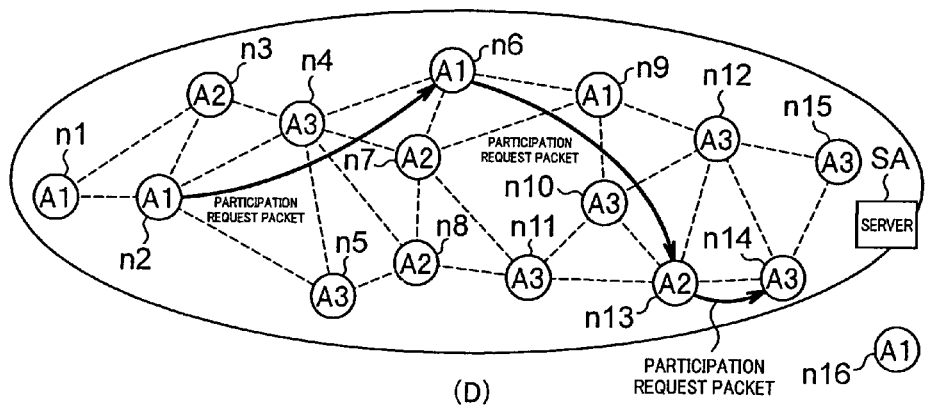
(D)
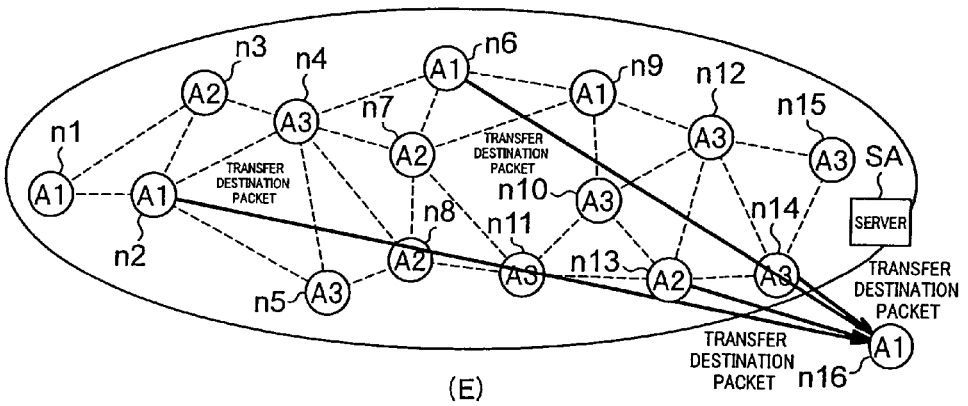
(E)
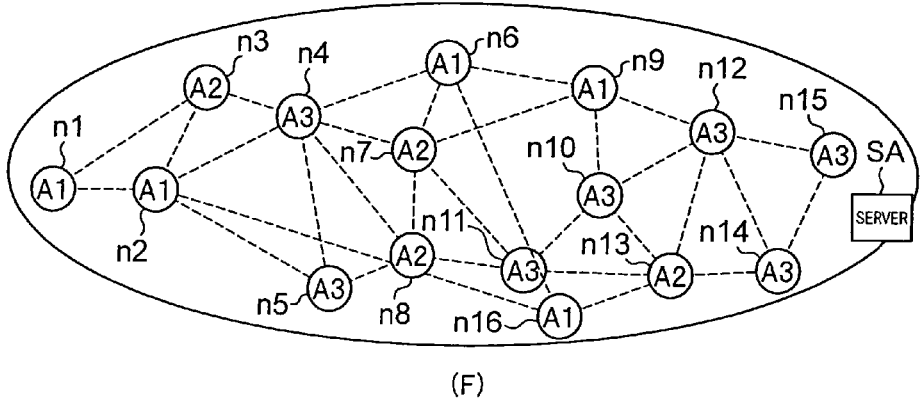
(F)

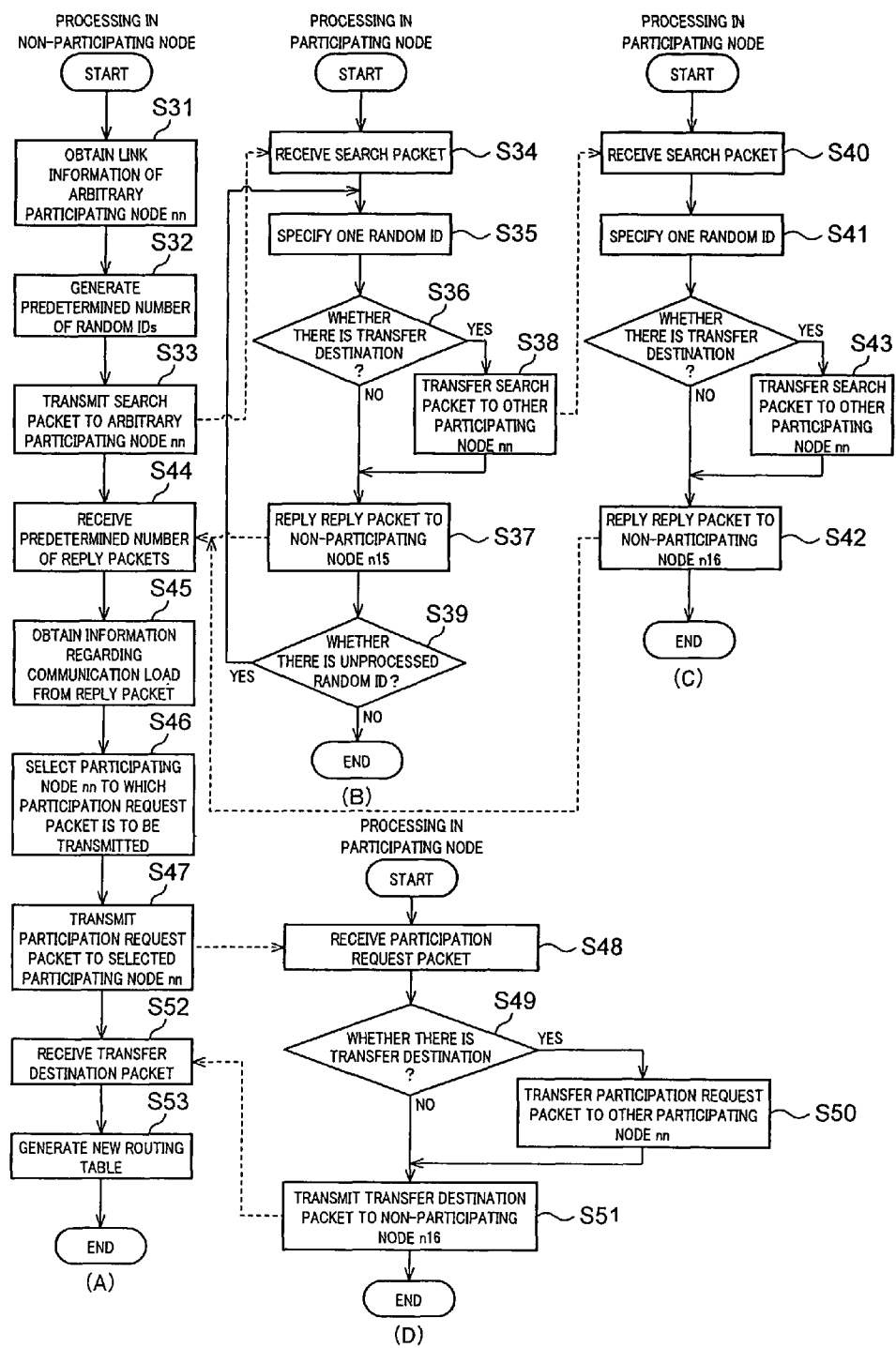

NODE DEVICE, INFORMATION TRANSFER PROCESSING PROGRAM, AND NETWORK PARTICIPATION PROCESSING METHOD AND THE LIKE

CROSS REFERENCE TO RELATED APPLICATION

This is a Continuation-in-Part of International Application No. PCT/JP2005/022919 filed Dec. 14, 2005, which claims the benefit of Japanese Patent Application No. 2005-003051 filed Jan. 7, 2005. The disclosure of the prior applications are hereby incorporated by reference herein in its entirety.

BACKGROUND OF THE INVENTION

1. Field of the Invention

The present invention relates to a peer to peer (P2P) information delivery system including a plurality of node devices connected with each other via a network and method or the like thereof and, especially, relates to a technical field for a non-participating node device to participate in an overlay network which is formed by participation of all or part of the plurality of node devices.

2. Discussion of Related Art

In the peer to peer information delivery system, for example, in an overlay network which is logically configured by use of a distributed hash table (hereinafter referred to as DHT), each of node devices which participates in the overlay network does not recognize link information (for example, IP address) of all the node devices, but retains only part of link information obtained on participation or the like and data inquiry or the like is performed on the basis of such link information.

In an overlay network thus structured, it is necessary that distribution of load be appropriately performed even when participation and withdrawal of node devices occur often. In Non-patent Document 1, a technique which enables appropriate distribution of load even when participation and withdrawal often occur is disclosed.

Non-patent Document 1: "Lightweight Load Balancing for Distributed Hash Table". Technical Report of the Institute of Electronics, Information, and Communication Engineers.

However, in the above conventional technique, locality, in other words, distance in a real network, is not considered with regard to link information of each of node devices. Therefore it is considered whether or not unnecessary load should be given to a real network.

SUMMARY OF THE INVENTION

The present invention has been made in consideration of the above problem and the like and aims at providing a node device, a network participation processing program, a network participation processing method, and the like which enables to configure an overlay network, in which a consideration has been given to locality, and to reduce unnecessary load to a real network.

To solve the above-mentioned problem, according to one aspect of the present invention there is provided a device which participates in an overlay network formed by participation of all or part of a plurality of node devices which are connected each other via communication means, including:

a search information transmission means for transmitting search information, provided for searching a node device to which participation request information indicative of request for participating in the overlay network is to be transmitted, to an information processing device connected to the communication means;

a reply information receiving means for respectively receiving reply information, replied from the plurality of node devices, which participate in the overlay network and receive the search information thus transferred with the information processing device;

a communication load information obtaining means for obtaining information, related to communication load in a communication route between the node devices that reply each of the reply information and the node device itself, out of the reply information thus respectively received;

a communication load comparison means for comparing information regarding communication load in each of the communication routes;

a node device selection means for selecting a node device to which the participation request information is to be transmitted among the plurality of node devices, which reply the reply information, on the basis of comparison result by the communication load comparison means; and a participation request information transmission means for transmitting the participation request information to the node device thus selected.

According to the present invention, a node device which requests participation to an overlay network is configured to obtain information regarding communication load in communication routes between the node device itself and each of node devices, for example, time to live (hereinafter referred to as TTL), from each reply information from a plurality of node devices participating in the overlay network, compare the information, select one node device of which communication route to the node device itself has the smallest communication load, in other words, closest in network, and participate in the overlay network by performing participation request to that node device. Hence, it is possible to configure an overlay network in which locality in a real network has been considered and to reduce unnecessary load to a real network.

BRIEF DESCRIPTION OF THE DRAWINGS

FIG. 2 shows an example of how a query transmitted from a participating node n4 is transferred to a route node n10 in a node ID space of DHT.

FIG. 3 shows an example of a routing table of DHT retained by a participating node n1.

FIG. 8 is a conceptual diagram showing an example of a case where the non-participating node nm newly participates in the overlay network 9 in the first Example.

FIG. 9 is a conceptual diagram showing an example of a case where the non-participating node nm newly participates in the overlay network 9 in the first Example.

FIG. 10A is a flow chart showing an example of processing in a control part 11 in non-participating node nm in a second Example and FIGS. 10B, 10C and FIG. 10D are flow charts showing an example of processing in control part 11 in the second Example.

DETAILED DESCRIPTION OF THE PREFERRED EMBODIMENTS

Figure 1:
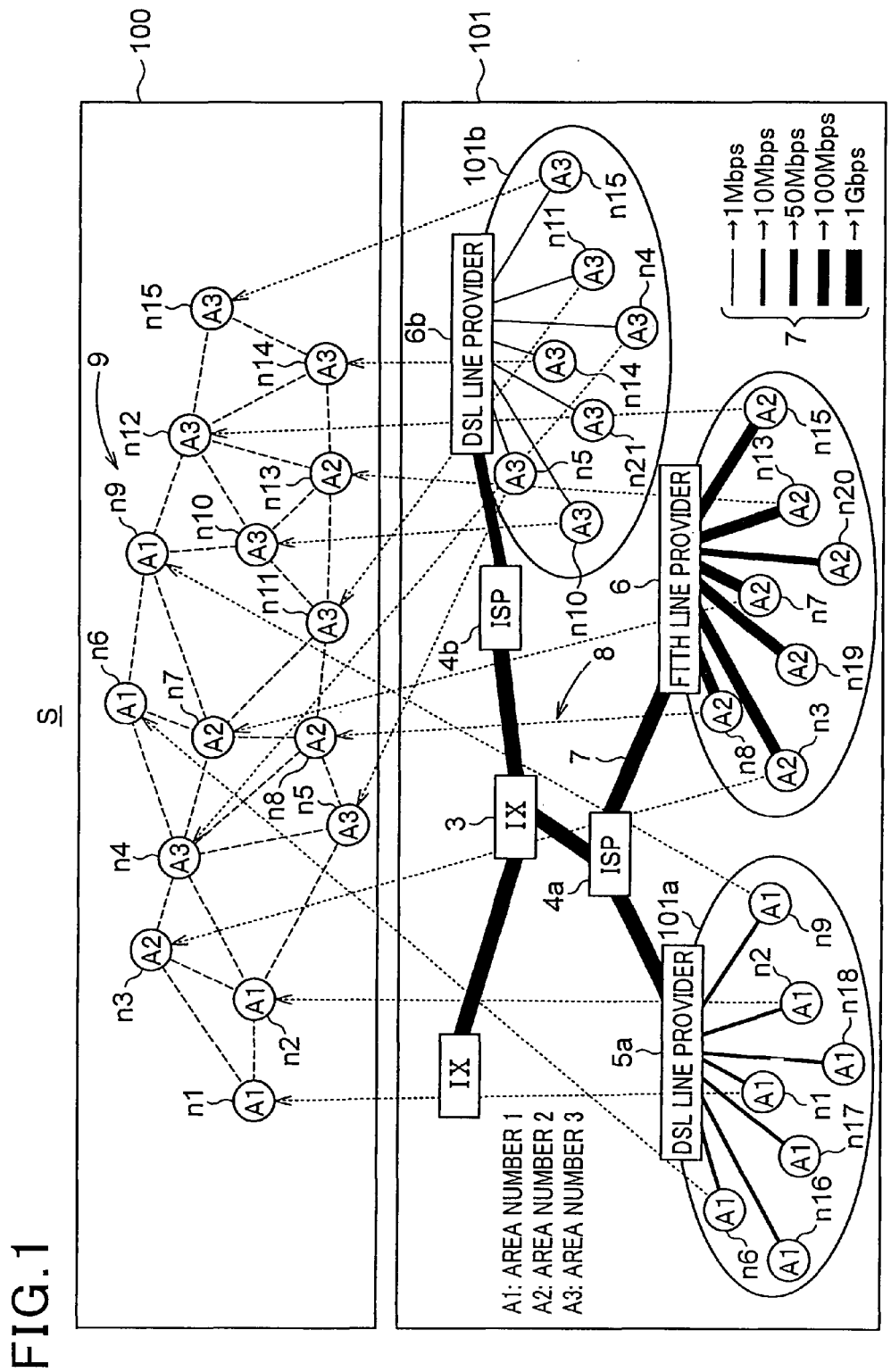
FIG. 1 shows an example of connection status of each of node devices in a content delivery system according to the present embodiment.

The present invention is not confined to the configuration listed in the foregoing embodiments, but it is easily understood that the person skilled in the art can modify such configurations into various other modes, within the scope of the present invention described in the claims. Hereinafter, each designation of numerical reference in the drawings is typically as follows:
1: node device;
8: network;
11: control part;
12: storage part;
13: buffer memory;
14: decoder;
15: image processing part;
16: display part;
17: audio processing part;
18: speaker;
20: communication part;
21: input part;
22: bus; and
S: content delivery system.

Embodiments

Embodiments of the present invention will be explained on the basis of drawings. Note that embodiments are for the case where the present invention is applied to a content delivery system.

[1. Configuration and the Like of Content Delivery System]

First, with reference to FIG. 1, general configuration and the like of a content delivery system will be explained.

FIG. 1 shows an example of connection status of each of node devices in a content delivery system according to the present embodiment.

As shown in lower rectangular frame 101 in FIG. 1, a network 8 (network in real world) of the Internet or the like is configured by an internet exchange (IX) 3, internet service providers (ISP) 4a and 4b, digital subscriber line providers (or their devices) 5a and 5b, fiber to home line provider ('s device) 6, and communication line (for example, such as a telephone line or an optical cable) 7 and the like. Here in the network 8 in FIG. 1, routers for transferring data (packet) are inserted appropriately, but they are omitted from the figure.

A content delivery system S is configured by a plurality of node devices n1, n2, . . . n21 which are connected with each other via such network 8 as communication means and is a peer to peer network system (actually, there are more node devices in the system). Moreover, to each of the node devices n1 to n21, unique manufacturing number and internet protocol (IP) address have been assigned respectively. Note that manufacturing number and IP address do not overlap in a plurality of node devices 1.

Furthermore, in the content delivery system S, an overlay network 9 shown in the upper rectangular frame 100 of FIG. 1 is configured by a specific algorithm, for example, an algorithm using DHT. It means that the overlay network 9 is a network which configures an imaginary link formed by use of an existing network 8 (a logical network).

In the present embodiment, the overlay network 9 configured by an algorithm using DHT is a premise and node devices n1 to n15 which are located in the overlay network 9 (in the upper rectangular frame 100 in FIG. 1) are referred to as node devices participating in the overlay network 9 (hereinafter, such node devices n1 to n15 are referred to as "participating node(s) nn" as a general term). In other words, the overlay network 9 is configured by participation of the participating nodes nn. Participation into such overlay network 9 is performed when node devices n16 to n21 (hereinafter referred to as "non-participating node(s) nm" as a general term) transmits participation request information indicating participation request to any of an arbitrary participating nodes nn.

Moreover, each of the participating nodes nn has a node ID as identification information and the node ID is, for example, a value obtained by hashing an IP address or manufacturing number by a common hash function (for example, SHA-1 or the like) (for example, bit length thereof is 160 bit) and is distributed and located in one ID space without deviation. Each of the (hashed) node IDs obtained by a common hash function in such a manner has a very low possibility of having same values when the IP address or the manufacturing number differs with each other. Note that regarding hash function, since it is heretofore known, detailed explanation thereof is omitted. Furthermore, in the present embodiment, node ID is obtained by hashing an IP address (global IP address) by a common hash function.

In addition, each of the participating nodes nn has a DHT respectively. The DHT includes a node ID or a later-described transfer destination information in which transfer destination of the content ID is included (in other words, route information to other participating nodes nn), that is, a routing table in which a plurality of pairs of node ID and IP address of other participating nodes nn which are appropriately distant in node ID space are included. Such a DHT is given when a non-participating node nm participates in the overlay network 9.

Furthermore, in the content delivery system S, participation of non-participating nodes nm into the overlay network 9, or withdrawal of participating nodes nn from the overlay network 9 occurs often. Therefore, it is periodically confirmed whether update of DHT is necessary or not (for example, with an interval of several dozen minutes to several hours) and, as the same time, the update information is transmitted to other participating nodes nn according to a routing table of DHT. Thus, it is possible to keep DHT in a latest condition.

Still furthermore, in the overlay network 9, various content data (for example, such as a movie or music) are distributed in a plurality of participating nodes nn to be saved (stored). For example, in the participating node n1, content data of a movie titled XXX is saved while in a participating node n2, content data of a movie title YYY is saves. In such a manner, different content data are distributed and saved in the plurality of participating nodes nn.

In addition, some content data is not always saved in one participating node nn and the one same content data may be saved in a plurality of participating nodes nn. For the content data, a content name (title) or the like is assigned respectively.

Moreover, location information (for example, IP address and manufacturing number of a participating node nn in which the content data is saved) indicating location of content data thus distributed and saved is also distributed and saved in a plurality of participating nodes nn. For example, a content name of certain content data (or first a few bytes of the content data) is hashed by the hash function, which is commonly used when the node ID is obtained (that is, located in the same ID space as hashed value of IP address of participating node nn), and location information of the content data is saved in a participating node nn having a node ID which is closest to the hashed value (the hashed value becomes content ID). That is, even when the one same content data (having same content ID) is saved in a plurality of participating nodes nn, location information indicating the location of such content data (IP address or the like of the plurality of participating nodes nn) can be managed by one participating node nn (hereinafter, such a participating node which manages location of content data will be referred to as "route node"). Note that in the present embodiment, in a route node of 1, location information of content data corresponding to content ID of 1 is saved (that is, route node and the location information have a 1:1 relationship). However, the present invention is not limited thereto.

Thus, a participating node n4, which is used by a user when the user wants to obtain (download) certain content data, transmits a query (inquiry information) to which content ID of the content data is attached to other participating nodes nn. The query to which the content ID has been attached reaches a route node n10, which saves location information indicating location of the content data, via several participating nodes nn (in each relay node, a routing table of the DHT is referred and the content ID is transferred). The participating node n4 is enabled to obtain (receive) the location information from the route node n10 and based on the obtained location information, is connected to, for example, a participating node n5 and is enabled to obtain (receive) the content data therefrom.

Note that the location information may also be obtained (received) from a participating node nn which caches the location information same as that of the route node n10 before content ID reaches the route node n10.

FIG. 2 is a view showing an example how a query transmitted from the participating node n4 is transferred to the route node n10 in a node ID space of DHT. In an example of FIG. 2, each of the relay nodes compares content ID attached to the received query and node ID registered in a routing table of DHT, specifies a participating node nn to which the query is to be transferred next (for example, specifies an IP address of a participating node nn corresponding to a node ID of which upper several digits match that of the content ID), and transfers the query thereto.

Here, a general concept of a routing table of the DHT will be explained.

Figure 4:
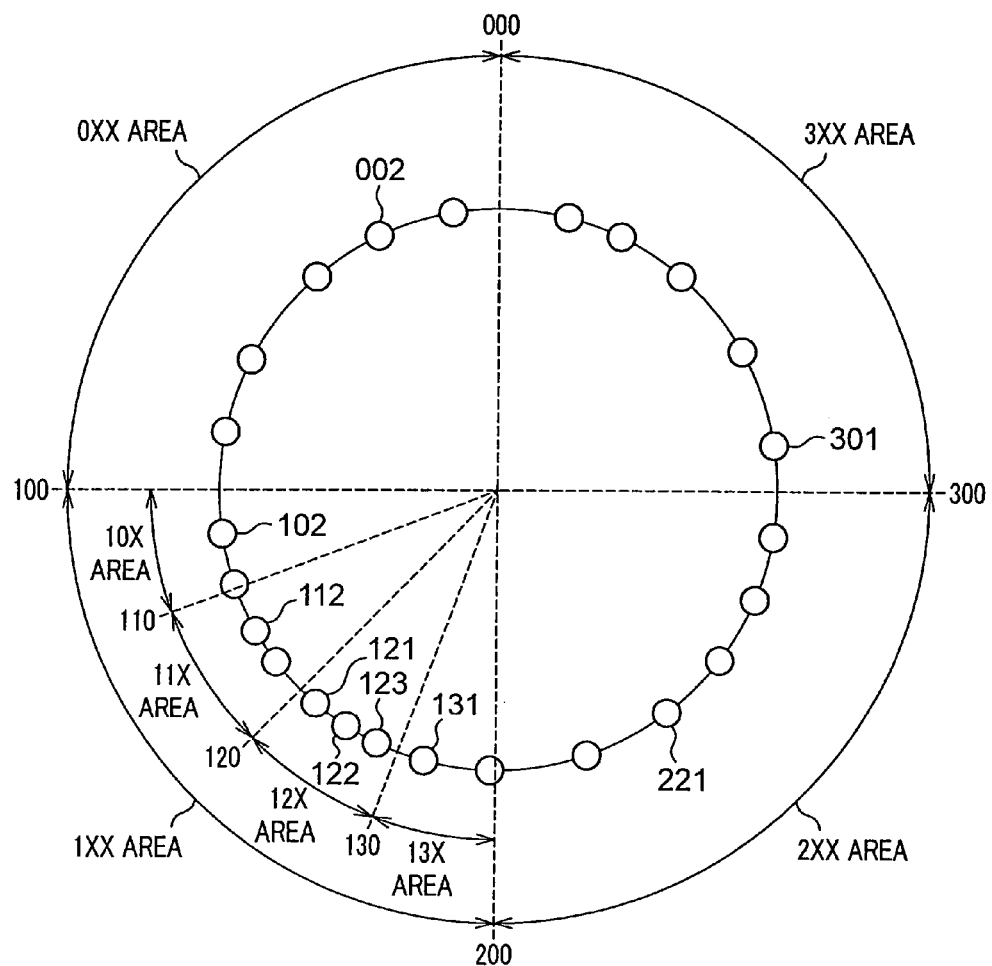
FIG. 4 is a conceptual diagram showing an example of a node ID space of DHT.

FIG. 3 is a view showing an example of a routing table of DHT retained by a participating node n1 and FIG. 4 is a conceptual diagram showing an example of a node ID space of DHT. Note that in FIGS. 3 and 4, for the convenience of explanation, bit length of node ID is set to be 2 bits×3 digits=6 bits and each digit is expressed by a number system of base-4 (integers from 0 to 4) (actually, longer bit length is used and each digit is, for example, divided by 4 bits and expressed by hexadecimal number system using 0 to f).

In an example of FIG. 3, a routing table of DHT includes tables level 1 to 3 and in the table of each level, a node ID and IP address of a participating node nn corresponding to the node ID are related and registered for each area. Each area of a table of each level is an area obtained by dividing a node ID space of DHT. For example, as shown in FIG. 4, in level 1, node ID space is divided into four, including a 0xx area where node IDs of "100" to "133" exist, a 1xx area where node IDs of "000" to "033" exist, a 2xx area where node IDs of "200" to "233" exist, and a 3xx area where node IDs of "300" to "333" exist. Moreover, in level 2, an area of the level 1 (that is, areas of 0xx to 3xx) is further divided into four, including a 10x area where node IDs of "100" to "103" exist, a 11x area where node IDs of "110" to "113" exist, a 12x area where node IDs of "120" to "123" exist, and a 13x area where node IDs of "130" to "133" exist.

Then, for example, when a node ID of a participating node n1 is "123", as shown in FIG. 3, on a table of an area of 1xx in level 1 of such a participating node n1 (where the node exists), node ID and IP address of the participating node n1 (since IP address belongs to the participating node n1, it is not needed to be registered on the routing table) are registered and in other areas where the participating node n1 does not exist (that is, areas of 0xx, 2xx, and 3xx) node IDs and IP addresses of other arbitrary participating nodes nn are registered respectively.

Moreover, on a table in an area of 12x in level 2 of the participating node n1 (the area where the participating node n1 exists), as shown in FIG. 3, node ID and IP address of the participating node n1 (since IP address belongs to the participating node n1, it is not needed to be registered on the routing table) are registered and in other areas where the participating node n1 does not exist (that is, areas of 10x, 11x, and 13x) node IDs and IP addresses of other arbitrary participating nodes nn are registered respectively.

Furthermore, in level 3 of the participating node n1, as shown in FIG. 3, node IDs and IP addresses of all the participating nodes nn existing in an area of 12x are registered.

Note that in the examples of FIGS. 3 and 4, bit length of node ID is assumed to be 3 digits×2 bits. Therefore, it is possible to cover in use of a 3-level table having levels 1 to 3. However, when the bit length of node ID is increased, a larger table is required as much (for example, when it is assumed that bit length of node ID is 16 digits×4 bits, a table for 16 levels is required).

Thus, in a routing table of DHT in the present embodiment, the higher the level becomes, the narrower the area becomes. Due to a routing table thus configured, a query transmitted from, for example, a participating node n1, is efficiently transferred to a route node.

Such a routing table of DHT is generated when a non-participating node nm transmits participation request information, to which node ID thereof has been attached, to an arbitrary participating node nn to participate in the overlay network 9.

A flow until generation of such a routing table of DHT will be explained below.

Figure 5:
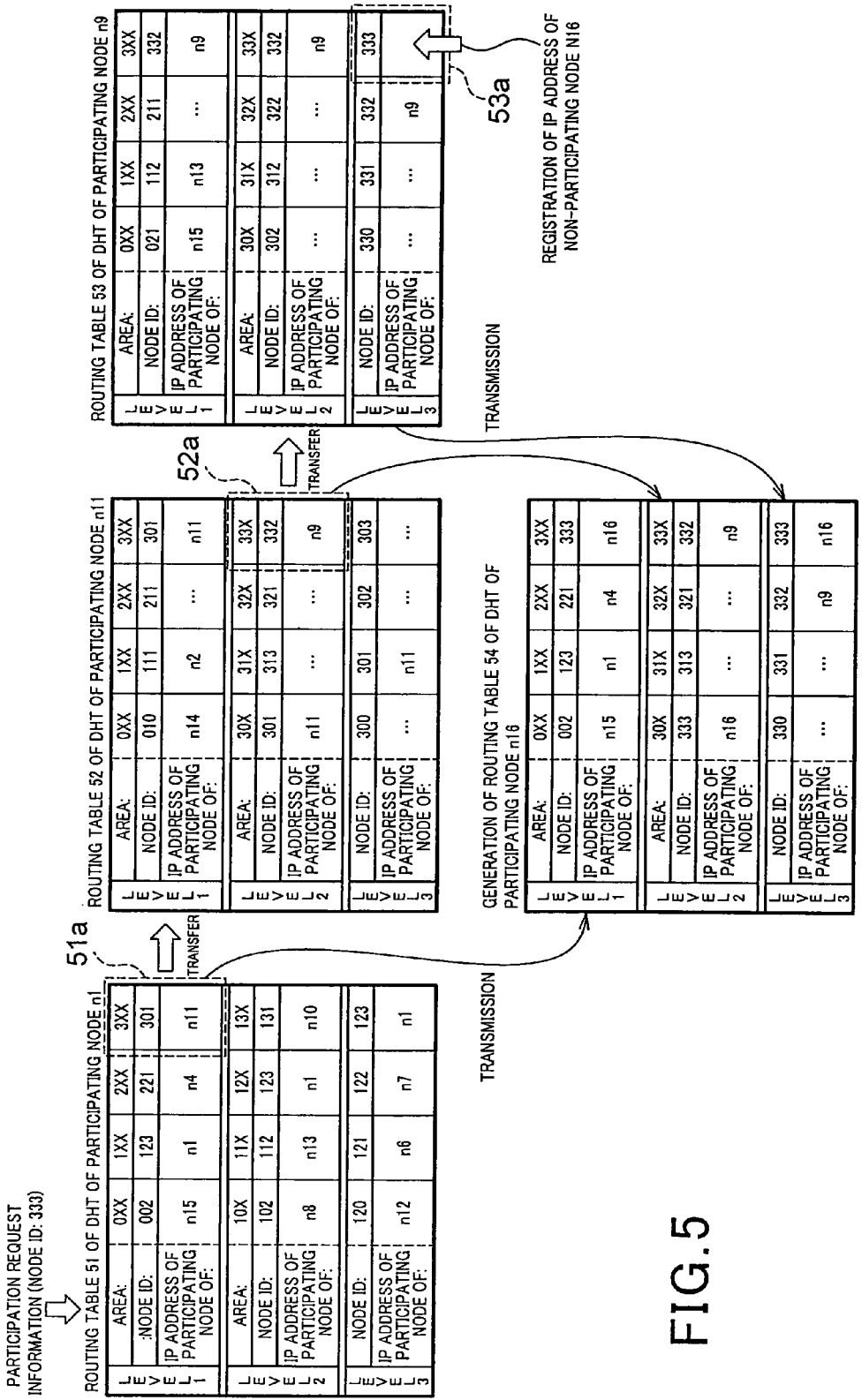
FIG. 5 is a conceptual diagram showing an example of a flow until a routing table of DHT is generated.

FIG. 5 is a conceptual diagram showing an example of a flow until such a routing table of DHT is generated.

For example, as shown in FIG. 5, the non-participating node n16 generates a node ID by hashing an IP address of itself by the hash function (for example, "333") and transmits participation request information to which the node ID and the IP address of itself have been attached to a participating node n1.

The participating node n1 receives the participation request information, refers to a routing table 51 of DHT, obtains an IP address of a participating node n11 which has a node ID "303" which is closest to the node ID "333" attached to the participation request information, and based on this, transfers participation request Information to which the node ID "333" and IP address of the non-participating node n16 have been attached to the participating node n11.

The participating node nil receives the participation request information, refers to a routing table 52 of DHT, obtains an IP address of a participating node n9 which has a node ID "332" which is closest to the node ID "333" attached to the participation request information, and based on this, transfers participation request information to which the node ID "333" and IP address of the non-participating node n16 have been attached to the participating node n9.

The participating node n9 receives the participation request information, relates the participation request information to node ID "333" in a table of level 3 in a routing table 53 of DHT, and registers the IP address of the non-participating node n16. That is, the participating node n9 manages the node ID "333".

In the above process, as shown in FIG. 5, the participating nodes n1, n11, and n9 which received the participation request information respectively transmits part of a routing table of DHT to the non-participating node n16 (the participating node n1 transmits a table 51a of level 1, the participating node nil transmits a table 52a of level 2, and the participating node n9 transmits the table 53a of level 3).

The non-participating node n16 receives part of a transmitted routing table of DHT and based on them, generates a routing table 54 of DHT of the non-participating node n16 itself (for example, a routing table 54 including the table 51a of level 1 for the participating node n1 (node ID "301" and an IP address corresponding thereto is replaced with the node ID "333" and IP address corresponding thereto of the non-participating node n16 itself) and the table 52a of level 2 for the participating node n11 (node ID "332" and an IP address corresponding thereto is replaced with the node ID "333" and IP address corresponding thereto of the node n16 itself) and the table 53a of the level 3 for the participating node n9 is generated).

The non-participating node n16 which has obtained the routing table 54 thus generated participates in the overlay network 9 as a participating node n16.

Meanwhile, it is preferable that a routing table of DHT thus generated reduces load (load caused by transferring information including node ID on the network 8) to the network 8 as much as possible. In the present embodiment, to generate a routing table which can reduce load to the network 8, a participating node nn to which participation request information is to be transmitted is selected in consideration of locality on the network 8.

1, it can be assumed that a participating node n1 and non-participating node n16 (in the reference numeral 101a) belonging to the one line provider (for example, line provider 5a) have locality while on the other hand, it can be assumed that the participating node n1 and a non-participating node 21 (in the reference numeral 101) which belongs to another line provider (for example, provider 5b) do not have locality (that is, it is necessary to pass through ISP 4a, IX3, and ISP4b). Note that in the example of FIG. 1, same area code (A1, A2, A3) are denoted to the participating node n1 and non-participating node n16 belonging to the one line provider.

The participating node nn of which locality on the network 8 has been considered a participating node nn which has locality with a non-participating node nm. That is, the participating node nn is close to the non-participating node nm on the network (in other words, communication load between non-participating node nm on communication route is relatively small). When a non-participating node nm selects such a participating node nn, transmits participation request information, and, as explained in FIG. 4, generates a routing table of DHT, for example, a packet is transmitted between participating nodes which are close with each other on the network and as a result, it becomes possible to reduce load to the network 8 in its entirety. Note that a detailed selection method of such a participating node nn will be described later.

Furthermore, the above flow can be applied not only when the non-participating node n16 newly participates in the overlay network 9 but also when the node has withdrawn and participates again.

Next, with reference to FIG. 6, configuration and function of participating node nn and non-participating node nm will be explained.

Figure 6:
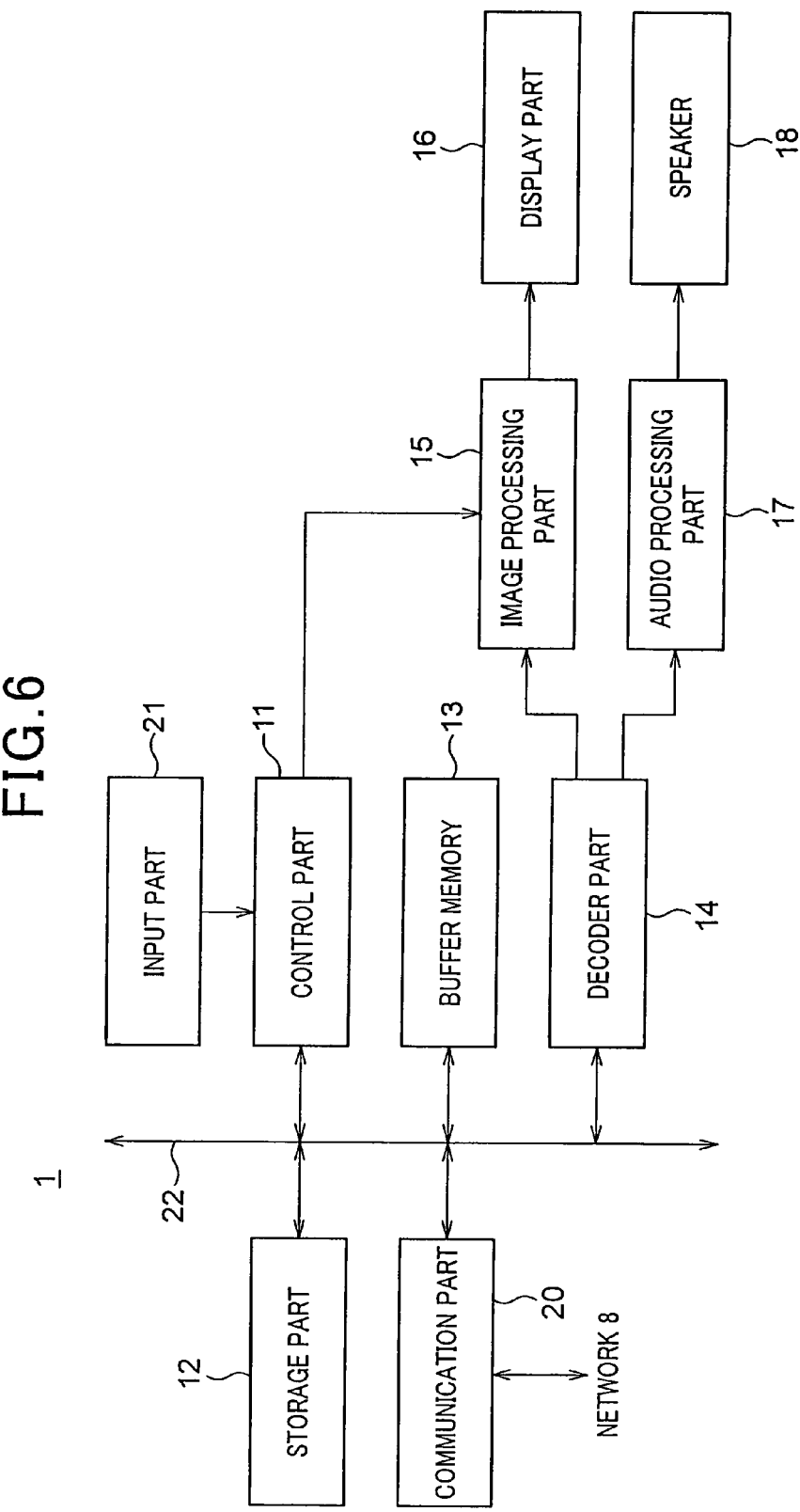
FIG. 6 shows a schematic configuration example of a participating node nn and a non-participating node nm.

FIG. 6 shows a schematic configuration of the participating node nn and non-participating node nm.

The participating node nn and non-participating node nm are configured by including, as shown in FIG. 6 respectively, a control part 11 which is a computer configured by having a CPU having computing function, a RAM for work, and a ROM for storing various data and programs, a storage part 12 configured by an HDD or the like for saving and retaining (storing) various data (for example, such as content data, location information, DHT), programs, and the like, a buffer memory 13 for temporarily storing received content data, a decoder 14 for decoding (stretching data or decrypt) encoded video data (image information 9 and audio data (voice information) included in the content data, an image processing part 15 for performing predetermined graphic processing to the decoded video data or the like to output the data as video signal, display part 16 such as CRT or liquid crystal display for displaying image based on the video signal outputted from the image processing part 15, audio processing part 17 for converting the decoded audio data by digital/analog (D/A) conversion into analog audio signal and thereafter amplifying the converted signal by an amplifier to output, a speaker 18 for outputting the audio signal outputted from the audio processing part 17 as acoustic wave, communication part 20 for performing communication control of information between other participating node nn or non-participating node nm via the network 8, and input part 21 which receives instruction from a user and provides instruction signal corresponding to the instruction to the control part 11 (for example, such as a keyboard, a mouse, or an operation panel) and the control part 11, the storage part 12, the buffer memory 13, the decoder part 14, and the communication part 20 are connected with each other via a bus 22.

In such a configuration, the control part 11 in non-participating node nm reads out and performs a program saved in the storage part 12 or the like (including a network participation processing program of the present invention) to control the whole of the node and, at the same time, functions as search information transmission means, reply information receiving means, communication load information obtaining means, communication load comparison means, node device selection means, participation request information transmission means, transfer destination information receiving means, and transfer destination information generation means of the present invention to perform later described various processing.

Moreover, the control part 11 of the participating node nn controls the whole of the node by causing a CPU to read and perform a program saved in the storage part 12 or the like and, at the same time, performs various processing such as transmission and reception of node ID and content ID, content data, location information and the like, and furthermore, receives search information, participation request information, and the like from non-participating node nm to perform various processing to be described later.

Note that the network participation processing program may be, for example, downloaded from a predetermined server on the network 8 or may be recorded in a recording medium such as a CD-ROM and read out through a drive of the recording medium.

[2. Operation of Content Delivery System]

Next, operation of the content delivery system S when a non-participating node nm newly participates in the overlay network 9 will be explained in Examples 1 and 2, respectively.

Example 1

First, with reference to FIGS. 7 to 9, operation of the content delivery system S in the Example 1 will be explained.

The Example 1 is an operation example in a case where a management server SA as an information processing device to manage participating node list in which link information to all the participating nodes nn (for example, IP addresses of all the participating nodes nn) is written in is connected to the network 8.

Figure 7:
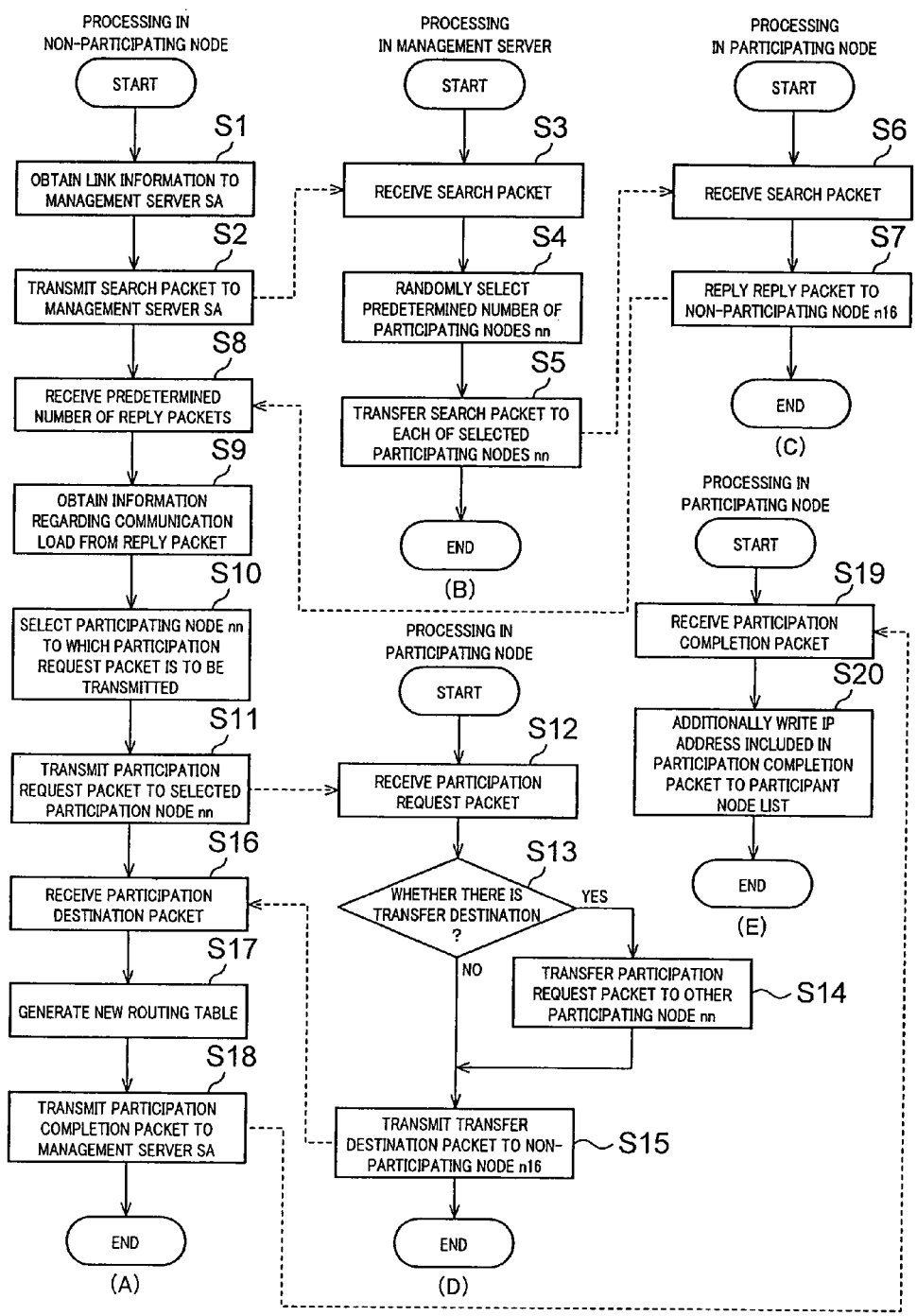
FIG. 7A is a flowchart showing an example of processing in a control part 11 in non-participating node nm in the first Example.
FIG. 7B and FIG. 7E are flow charts showing an example of processing in a management server in the first Example.
FIG. 7C and FIG. 7D are flow charts showing an example of processing in the control part 11 in the participating node nn.

FIG. 7 (A) is a flow chart showing an example of processing by the control part 11 in the non-participating node nm in the Example 1, FIGS. 7 (B) and (E) are flow charts showing an example of processing by a management server in the Example 1, and FIGS. 7 (C) and (D) are flow charts showing an example of processing by the control part 11 in a participating node nn in the Example 1. In addition, (A) to (F) in FIGS. 8 and 9 are conceptual views showing an example of a case where a non-participating node nm newly participates in the overlay network 9 in the Example 1.

First, in the processing in FIG. 7 (A), for example, the control part 11 of the non-participating node n16 obtains link information to the management server SA (for example, an IP address of the management server SA or a unique ID corresponding to the IP address) (Step S1). The link information of the management server SA may be saved in the non-participating node n16 in advance (for example, set when shipped) or may be inputted via the input part 21.

Next, the control part 11 of the non-participating node n16 generates a search packet which is search information for searching for a participating node nn to which participation request information indicating participation request to the overlay network 9 (hereinafter referred to as "participation request packet") is to be transmitted. Sender's address of the search packet is the IP address of the non-participating node n16 while destination address thereof is the IP address of the management server SA. The control part 11 transmits the search packet thus generated to the management server SA as search information transmission means via the communication part 20 and the network 8 (Step S2: FIG. 8 (A)). Thus, the control part 11 of the non-participating node n16 waits for reply information from an arbitrary participating node nn.

Next, in the processing in FIG. 7 (B), the management server SA receives the search packet transmitted from the non-participating node n16 (Step S3) and selects a predetermined number of participating nodes nn (for example, between 5 and 10) from the participating nodes randomly (Step S4).

Then the management server SA generates search packets including the IP address of the non-participating node n16, of which sender's address has been set to be the IP address of the management server SA and destination address has been set to be IP addresses of the selected participating nodes nn, as many as the predetermined number (for example, 5 in an example of FIG. 8 (A)) and transmits (transfers) the search packets to each of the selected participating nodes nn via the network 8 (Step S5: FIG. 8 (A)) and finishes the processing.

Note that with regards to the number of participating nodes nn selected by the management server SA, the larger the number becomes, the more accuracy is improved. However, it also means increased load to the whole of the network 8.

Therefore, it is preferable to set an appropriate number according to system environment. For example, setting the number around 10, load to the whole of the network 8 is small while the accuracy can be expected.

In addition, the number may be dynamically changed according to the number of nodes participating in the overlay network 9.

Next, in the processing in FIG. 7 (C), when the control part 11 of a participating node nn receives the search packet transmitted (transferred) from the management server SA (Step S6), generates reply information of which sender's address is set to be an IP address of the participating node nn's and destination address is set to be the IP address of the non-participating node n16 (hereinafter referred to as "reply packet") and transmits (replies) the reply packet to the non-participating node n16 via the communication part 20 and the network 8 (Step S7: FIG. 8 (B)) to finish the processing.

Note that there is a case where TTL indicating expiry period of the packet is included in the reply packet or the like. The TTL is expressed by an integer value of which maximum value is "225" and is decreased by 1 when the packet passes (is transferred) through a router or the like. When TTL becomes "0", the packet is disposed at that point of time and a disposal notification is transmitted to the sender of the packet. Therefore, the larger value of TTL of the packet means the smaller number of the packet being transferred (HOP number) and which means effect to the communication load in the communication route of the network 8 is small.

Next, in the processing in FIG. 7 (A), the control part 11 of the non-participating node n16 receives each of the reply packet transmitted from the participating nodes nn as reply information receiving means (Step S8) and, for example, when a predetermined period of time has elapsed, or the a predetermined number of packets (the predetermined number may be specified by the management server SA from the non-participating node n16) have been received, the processing proceeds to Step S9.

In Step S9, the control part 11 of the non-participating node n16 obtains information, for example, TTL, which is regarding communication load in each of communication routes between the non-participating node n16 and each of the participating nodes nn which has replied the reply packet from each of the reply packets as communication load information obtaining means.

Then, the control part 11 of the non-participating node n16 compares information regarding communication load in each of communication routes, for example, TTL, as communication load comparison means and selects one participating node nn to which a participation request packet is to be transmitted from the plurality of participating nodes nn which have replied the reply packet as node device selection means (Step S10). For example, among the plurality of participating nodes nn, one of which communication load in a communication route between the non-participating node n16 is the smallest (for example, having the largest TTL (having the smallest HOP number)) is selected. Thus, a participation node nn of which locality on the network 8 has been taken into consideration (close to the non-participating node nm) is selected.

Note that as information regarding communication load in the communication route between non-participating node and a participating node, TTL was taken as an example. However, this invention is not limited to this example and, for example, width of effective bandwidth in a communication route (data transfer speed) or time for a reply packet to reach from a participating node nn may also be applied. When effective bandwidth in a communication route is used, bandwidth in communication route between each of participating nodes nn and non-participating node nm is compared with each other and a participating node nn having the widest bandwidth is selected (this is because the wider the bandwidth becomes, the smaller the communication load becomes).

Next, the control part 11 of the non-participating node n16 generates a node ID by hashing an IP address of the non-participating node n16 by the hash function and, at the same time, generates a participation request packet of which sender's address is the IP address of the non-participating node n16 and destination address is an IP address of the selected participating node nn, attaches the node ID of the non-participating node n16 to the participation request packet, and transmits the participation request packet to the selected participating node nn through the communication part 20 and the network 8 as participation request information transmission means (Step S11: FIG. 8 (C)).

Then, in the processing of FIG. 7 (D), the control part 11 of the participating rode nn receives the participation request packet transmitted from the non-participating node n16 (Step S12) and refers to a routing table of DHT to judge whether there is a transfer destination (Step S13). At this time, the control part 11 judges, for example, whether the participating node nn has a node ID closest to the node ID attached to the participation request packet or not and when the participating node nn has the closest node ID (that is, the participating node nn manages the node ID attached to the participation request packet), judges that there is no transfer destination (Step S13: N) and the processing proceeds to Step S15. On the other hand, when the participating node nn does not have the closest ID (that is, there is other participating node nn having the closest node ID), the control part 11 of the participating node nn judges that there is a transfer destination (Step S13: Y), obtains an IP address corresponding to a node ID closest to the node ID attached to the participation request packet from a routing table of DHT, generates a participation request packet of which sender's address is the IP address of the participating node nn and destination address is the IP address obtained from the routing table and transmits (transfers) the packet to the other participating node nn corresponding to the IP address obtained from the routing table via the communication part 20 and the network 8 (Step S14: FIG. 9 (D)) and then, the processing proceeds to Step S15. The participation request packet thus transferred is transferred to the other participating node nn which manages the node ID attached to the participation request packet, as described above with reference to FIG. 5.

In Step S15, the control part 11 of the participating node nn generates transfer destination information of which sender's address is the IP address of the participating node nn and destination address is IP address of the non-participating node n16 (hereinafter referred to as "transfer destination packet") and includes part of a routing table of DHT, transmits the transfer destination packet to the non-participating node n16 through the communication part 20 and the network 8 (FIG. 9(E)), and finishes the processing.

Note that until the participation request packet reaches a participating node nn which manages a node ID attached to the participation request packet, in any participating node nn which received the participation request packed, processing in FIG. 7 (D) is also performed.

Next, in the processing of FIG. 7 (A), the control part 11 of the non-participating node n16 receives each of transfer destination packet transmitted from participating nodes nn as transfer destination information receiving means (Step S16) and, for example, when a predetermined period of time elapses, processing proceeds to Step S17.

In Step S17, the control part 11 of the non-participating node n16 obtains part of a routing table of DHT from each of the received transfer destination packet as transfer destination information generation means and, on the basis of the obtained information, as described above with reference to FIG. 5, generates a new routing table and saves it. Thus, participation of the non-participating node n16 into the overlay network 9 is completed (FIG. 9 (F)).

Then, the control part 11 of the non-participating node n16 generates a participation completion packet of which sender's address is the IP address of the non-participating node n16 and destination address is the IP address of the management server SA (participation completion information indicating completion of participation into the overlay network 9), transmits the participation completion packet to the management server SA through the communication part 20 and the network 8 (Step S18) and finishes the processing.

Next, in the processing in FIG. 7 (E), the management server SA receives the participation completion packet transmitted from the non-participating node n16 (Step S19) and upon reception, writes the IP address included in the participation completion packet to a participating node list (Step S20) and finishes the processing.

As described above, according to the Example 1, a non-participating node nm obtains information regarding communication load in communication routes between each of a plurality of participating nodes nn which has replied a reply packet and the non-participating node nm, for example, TTL, from the reply packet from the plurality of participating nodes nn participating in the overlay network 9, compares the information with each other, selects a participating node nn of which communication load in a communication route between the participating node nn and the non-participating node nm is the smallest (for example, having the largest TTL (or the smallest HOP number)), in other words, a participating node nn closest to the non-participating node nm on the network, and performs participation request thereto to participate in the overlay network 9. Therefore, it is possible to configure the overlay network 9 in which consideration has been given to locality on the network 8 and to reduce unnecessary load to the network 8 (first effect).

Moreover, the management server SA only manages a participating node list in which link information to all the participating nodes nn (for example, IP addresses of all the participating nodes nn) is written and transfers a participation request packet by randomly selecting a plurality of participating nodes nn. Thus, reply packets are replied from the plurality of participating nodes nn to a non-participating node nm and thanks to this processing, a participating node nn which is the closest to the non-participating node nm on the network is selected. Therefore, the management server SA does not need to recognize a participating node nn which is the closest to the non-participating node nm and hence, management cost of the management server SA can be reduced.

Example 2

First, with reference to FIG. 10, operation of the content delivery system S in Example 2 will be explained.

The Example 2 is, different from the Example 1, an operation example in a case where a management server to manage link information to all the participating nodes nn is not connected to the network 8.

FIG. 10 (A) is a flow chart showing an example of processing by control part 11 in a non-participating node nm in the Example 2 and FIG. (B) to (D) are flow charts showing an example of processing by the control part 11 in a participating node nn in the Example 2.

First, in the processing in FIG. 10 (A), for example, control part 11 of a non-participating node n16 obtains link information of an arbitrary participating node nn (for example, IP address of an arbitrary participating node nn or a unique ID corresponding to the IP address) (Step S31). The link information of such an arbitrary participating node nn may be, for example, saved in the non-participating node n16 in advance (for example, when shipped) or may be inputted via the input part 21.

Then, the control part 11 of the non-participating node n16 generates a predetermined number (for example between 5 and 10) of random IDs by hashing the predetermined number of random numeric values by the hash function (hereinafter referred to as random ID) as identification information generation means (Step S32).

Subsequently, the control part 11 of the non-participating node n16 generates a search packet of which sender's address is the IP address of the non-participating node n16 and destination address is an IP address of the arbitrary participating node nn, attaches the predetermined number of random IDs thus generated to the search packet, and transmits the search packet to the arbitrary participating node nn as an example of an information processing device via the communication part 20 and the network 8 (Step S33). Thus, the control part 11 of the non-participating node n16 waits for a reply packet from the arbitrary participating node nn.

Next, in the processing in FIG. 10 (B), the control part 11 of the arbitrary participating node nn receives the search packet thus transmitted from the non-participating node n16 (Step S34) and specifies one of the random IDs attached to the search packet (Step S35).

Then, the control part 11 of the arbitrary participating node nn refers to a routing table of DHT to judge whether there is transfer destination (Step S36). At this time, the control part 11 judges, for example, whether the arbitrary participating node nn has a node ID closest to the random ID thus specified which is attached to the participation request packet or not and when the participating node nn has the closest node ID (that is, the participating node nn manages the random ID), judges that there is no transfer destination (Step S36: N). Subsequently, the control part 11 of the arbitrary participating node nn generates a reply packet of which sender's address is the IP address of the arbitrary participating node nn and destination address is the IP address of the non-participating node n16 and transmits (replies) the reply packet to the non-participating node n16 via the communication part 20 and the network 8 (Step S37) and the processing proceeds to Step S39.

On the other hand, when the arbitrary participating node nn does not have the closest ID (that is, there is other participating node nn having the closest node ID), the control part 11 of the arbitrary participating node nn judges that there is transfer destination (Step S36: Y), obtains an IP address corresponding to a node ID closest to the random ID thus specified from a routing table of DHT, generates a search packet of which sender's address is the IP address of the arbitrary participating node nn and destination address is the IP address obtained from the routing table and transmits (transfers) the search packet to the participating node nn corresponding to the IP address obtained from the routing table (Step S38) and then, the processing proceeds to Step S39.

In Step S39, the control part 11 of the arbitrary participating node nn judges whether any of the predetermined number of random ID has not been specified in Step S35 yet or not and when there is a random ID which has not been specified yet (Step S39: Y), the processing returns to Step S35, specifies unspecified random ID, and repeat processing similarly to the above (Steps S 36 to 39). Meanwhile, when there is no random ID which has not been specified in Step S35 (Step S39: N), that is, when all of the predetermined number of random IDs have been specified, the processing is finished.

Next, in the processing in FIG. 10 (C), the control part 11 of a participating node nn receives a search packet thus transmitted from the arbitrary participating node nn (Step S40) and refers to a routing table of DHT to judge whether there is transfer destination (Step S41). For example, the participating node nn judges whether the node itself has a node ID closest to a random ID included in the search packet and when the participating node nn has the one, it is judged that there is no destination for transfer (Step S41: N). Then, the control part 11 of the participating node nn generates a reply packet of which sender's address is the IP address of the participating node nn and destination address is the IP address of the non-participating node n16 and transmits (replies) the reply packet to the non-participating node n16 via the communication part 20 and the network 8 (Step S42) and finishes the processing.

On the other hand, when the participating node nn does not have the closest ID (that is, there is other participating node nn having the closest node ID), the control part 11 of the participating node nn judges that there is transfer destination (Step S41: Y), obtains an IP address corresponding to a node ID closest to the random ID included in the search packet from a routing table of DHT, generates a search packet of which sender's address is the IP address of the participating node nn and destination address is the IP address obtained from the routing table and transmits (transfers) the search packet to the participating node nn corresponding to the IP address obtained from the routing table (Step S43) and finishes the processing. The search packet thus transferred in Step S43 is transferred until it reaches a participating node nn which manages a random ID included in the search packet and, in the participating node nn to which the search packet has been transferred, processing in the FIG. 10 (C) is also performed.

Next, in the processing in FIG. 10 (A), the control part 11 of the non-participating node n16 receives search packets thus transmitted from the arbitrary participating node nn (Step S44) and the processing proceeds to Step S45 when a predetermined period of time has elapsed or a predetermined number of packet has been received.

Note that processing in Steps S45 to S53 are similar to the above described Steps 9 to 17 in the Example 1. Therefore, redundant explanation is omitted here.

As explained above, according to the Example 2, in addition to obtaining the first effect of the Example 1, it is possible to select a participating node nn which is close to anon-participating node nm on the network without providing a management server SA. Therefore, it is possible to avoid concentration of search packets from a plurality of non-participating nodes nm to the management server SA (concentration of loads) and, at the same time, to reduce cost for providing the management server SA.

Note that in the above Example 2, the control part 11 of the non-participating node n16 is configured to generate random IDs in Step S32. However, the present invention is not limited thereto and, for example, the control part 11 of the arbitrary node nn may generate the random IDs as an example of an information processing device. In this case, the control part 11 of the non-participating node n16 generates a search packet of which sender's address is the IP address of the non-participating node n16 and destination address is the IP address of the arbitrary participating node nn in Step S33 and transmits the search packet to the arbitrary participating node nn via the communication part 20 and the network 8. Then, the control part 11 of the arbitrary participating node nn receives the search packet thus transmitted from the non-participating node n16 in Step S34, generates a predetermined number (for example between 5 and 10) of random IDs by hashing the predetermined number of random numeric values by the hash function, specifies one random ID among the predetermined number of random IDs, and proceeds to Step S36.

In addition, in the above embodiments, an overlay network 9 configured by an algorithm using DHT was a premise. However, the present invention is not limited thereto.

Furthermore, the present invention is not restricted to the above embodiments. The embodiments are examples and any device or system that has substantially same configuration to the technical idea described in the claims of the present invention and exhibits similar effects is included in the technical scope of the present invention.

What is claimed is:

1. A node device which newly participates in an overlay network formed by participation of all or part of a plurality of node devices which are connected to each other via a communication device, comprising:
    a search information transmission device for transmitting search information, for searching for another node device to which participation request information indicative of a request for participating in the overlay network is to be transmitted, to an information processing device connected to the communication device;
    a reply information receiving device for receiving reply information, replied from any of the plurality of node devices, which participate in the overlay network and receive the search information transferred by the information processing device;
    a communication load information obtaining device for obtaining communication load information, related to a communication route between the node devices that reply each of the reply information and the node device itself, out of the reply information thus respectively received;
    a communication load comparison device for comparing the communication load information regarding each of the communication routes;
    a node device selection device for selecting a node device to which the participation request information is to be transmitted among the plurality of node devices, which reply the reply information, based on a comparison result by the communication load comparison device; and
    a participation request information transmission device for transmitting the participation request information to the node device thus selected.

2. The node device according to claim 1,
    wherein the node selection device selects a certain node device providing a smallest communication load in the communication route between the node device itself and the certain node device out of the plurality of node devices which reply the reply information.

3. The node device according to claim 1, further comprising:
    an identification information generation device for generating a plurality of different identification information, wherein the search information transmission device attaches the plurality of identification information thus generated to the search information and transmits the information to the information processing device,
    the search information being transferred from the information processing device to a node device which manages each of the identification information according to the identification information, and
    the reply information receiving device receives the reply information replied from the node device, which receives the search information and manages the identification information respectively.

4. The node device according to claim 1,
    wherein the search information is transferred from the information processing device to each of node devices which manage each of the identification information according to a plurality of identification information which are different from each other and are generated by the information processing device, and
    the reply information receiving device receives each of the reply information replied from the node devices, which receive the search information, and manages each of the identification information.

5. The node device according to claim 1,
    wherein the participation request information transmission device attaches identification information unique to the node device itself to the participation request information and transmits the participation request information to the node device thus selected,
    the participation request information being transferred according to the unique identification information from the node device that receives the participation request information to a node device, which manages the unique identification information, and
    the node device further comprising:
    a transfer destination information receiving device for receiving transfer destination information including destination of the identification information transmitted from each of the node devices, which transfers the participation request information; and
    a transfer destination information generation device for generating new transfer destination information based on each of the transfer destination information thus received.

6. The node device according to claim 1,
    wherein the communication load information obtaining device obtains time to live (TTL) as information regarding the communication load from each of the reply information thus received, and
    the communication load comparison device compares the TTL thus obtained.

7. A non-transitory computer readable storage medium causing a computer in a node device to execute steps of:
    searching for another node device, of a plurality of node devices, to which participation request information indicative of a participation request to an overlay network is to be transmitted;
    receiving each of reply information replied from any of the plurality of node devices, each of which receives search information transferred by an information processing device;
    obtaining communication load information regarding communication routes between the node device and each of the plurality of node devices which reply each of the reply information from the received reply information;

comparing the communication load information regarding each of the communication routes;

selecting the other node device to which the participation request information is to be replied from the plurality of node devices, which reply the reply information, based on the comparing load information step; and transmitting the participation request to the other node device, wherein the node device newly participates in the overlay network, the overlay network being formed by participation of all or part of the plurality of node devices connected to each other via a communication device.

8. A network participation processing method for a new node device to newly participate in an overlay network, formed by participation of part or all of a plurality of node devices, which are connected each other via a communication device, the network participation processing method comprising steps of:

transmitting search information to search for a node device to which participation request information indicative of a participation request to the overlay network, is to be transmitted, to an information processing device connected to the communication device;

receiving reply information, replied from any of the plurality of node devices which participate in the overlay network and receives the search information transferred by the information processing device;

obtaining communication load information regarding communication routes between the node devices which reply the reply information and the node device itself;

comparing the communication load information regarding each of the communication routes;

selecting a certain node device to which the reply information is to be transmitted on the basis of a comparison result by the communication load comparison device out of the plurality of the node devices, and;

transmitting the participation request information to the node device thus selected.

* * * * *